United States Patent [19]

Loziuk

[11] Patent Number: 5,240,232
[45] Date of Patent: Aug. 31, 1993

[54] PIPE RESTRAINT

[75] Inventor: Lawrence A. Loziuk, Vernon Hills, Ill.

[73] Assignee: ABB Impell Corporation, San Ramon, Calif.

[21] Appl. No.: 915,477

[22] Filed: Jul. 16, 1992

Related U.S. Application Data

[63] Continuation-in-part of Ser. No. 808,132, Dec. 16, 1991, abandoned.

[51] Int. Cl.[5] .............................................. F16F 3/02
[52] U.S. Cl. .................................... 267/136; 248/570; 248/626; 248/628; 248/901; 267/148
[58] Field of Search ............... 267/136, 147, 148, 149; 188/378; 248/570, 603, 626, 628, 630, 638, 901

[56] References Cited

U.S. PATENT DOCUMENTS

| | | | |
|---|---|---|---|
| 2,421,822 | 6/1947 | Wood | 248/562 X |
| 3,204,911 | 9/1965 | Lawrence et al. | 267/148 X |
| 4,190,227 | 2/1980 | Belfield et al. | 248/536 |
| 4,397,069 | 8/1983 | Camossic | 248/570 K |
| 4,783,038 | 11/1988 | Gilbert et al. | 248/570 |
| 4,955,467 | 9/1990 | Kallenbach | 188/381 |

OTHER PUBLICATIONS

Loziuk, Larry A. *A Wire Rope Seismic Support* Nuclear Engineering and Design 107 (1988) 201-204, North Holland, Amsterdam.

*Primary Examiner*—George E. A. Halvosa
*Attorney, Agent, or Firm*—John H. Mulholland

[57] ABSTRACT

Helical isolator ($I^1$, $I^2$) in a turnbuckle frame (10) on a central rod (2) with connector rods (34, 36) of opposite handed threads, are for mounting between a pipe and an adjacent structure. The wire energy absorbing rope bights (32) of the isolator $I^1$, $I^2$ are placed in parallel planes and in a state of precompression and have bi-linear spring properties which are adjustably provided by the diameter of the structural tube (10) and spacer bars (30) attached to the tube wall (12) as part of the bases (26, 28) of the isolators.

7 Claims, 9 Drawing Sheets

(Prior Art)

Fig. 3

(Prior Art)

PIPE RESTRAINT

BACKGROUND

This application is a continuation in part of U.S. patent application Ser. No. 07/808,132 filed Dec. 16, 1991 for PIPE RESTRAINT, now abandoned.

Figure 1:
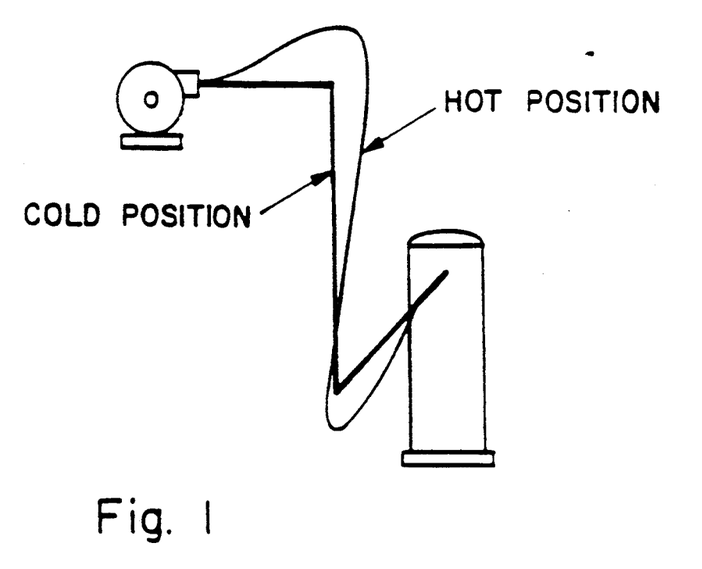
FIG. 1 is a schematic elevational view of a pipe connected between process equipment, a pump and a tank, showing the effect of temperature change on the pipe, with both a cold position of the pipe and a hot position of the pipe due to thermal growth induced by a hot fluid in the pipe illustrated.

Piping systems are typically anchored at two or more ends by the process equipment they connect. As the pipe expands due to thermal growth induced by a hot process fluid, it will deform as shown in FIG. 1. If restraints are required to limit dynamic displacements at locations on the pipe which also have thermal movements, a design conflict will exist. This is true in electrical generating plants, for example, where thermal pipe growth may approach 450 mm (18 inches).

Figure 1A:
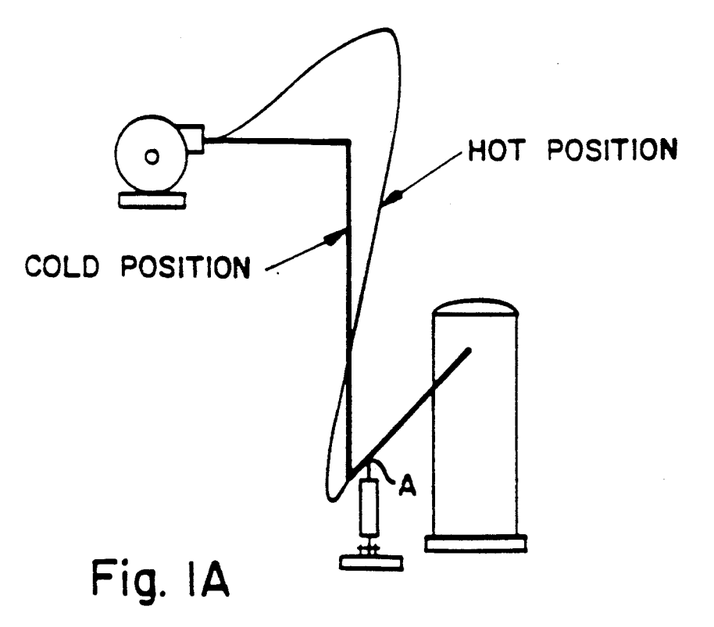
FIG. 1A is a view similar to FIG. 1 with a rigid pipe restraint fastened at point "A" such that the pipe does not expand as in FIG. 1 and may result in an overstressed condition in the pipe or an unacceptable load on the process equipment.

For example, if one was to place rigid restraint at Point A, as shown in FIG. 1A, the pipe would not expand as shown in FIG. 1 and may result in an overstressed condition in the pipe or an unacceptable load on the process equipment. Industry traditionally has resolved this conflict with the use of snubbers. Snubbers allow the pipe to freely expand but momentarily restrain the pipe during a dynamic event. Both mechanical and hydraulic snubbers commonly have been used to restrain piping systems. The problems with snubbers are that they are complex, require maintenance and have a history of failure. These problems have resulted in costly inspection programs in, for example, the nuclear industry. This in turn has prompted many utilities to reduce snubber populations and consider alternatives.

An alternative to snubbers is the use of gapped supports. The disadvantage of this form of dynamic restraint is that it absorbs no energy and imparts very high impact loads on the structure.

Another alternative to snubbers is the use of energy absorbers. Others have proposed varying forms of energy absorbers. One type uses steel plates to absorb energy through plastic deformation of the plates. See U.S. Pat. No. 4,620,688. A drawback of this device is its low cycle fatigue life. Another proposed type of energy absorber is shown in U.S. Pat. No. 4,955,467. Energy is absorbed by friction in this device. A major drawback of the patented device is the large amount of variability in the resulting friction force.

In yet another device, the basic element of the restraint is the multi-stranded helical cable trapped between two plates such that energy is absorbed by the deformation of the cable when vibration occurs. This component of the device, known as an "isolator", has been utilized by the military, in satellites, warships, space shuttles, aircraft, off-road vehicle applications, and other areas for many years. The primary use of isolators has been to minimize the transmission of vibration from one component to another. The major producer of isolators is AEROFLEX International, Inc. of Plainview, N.Y., 11805, assignee of U.S. Pat. Nos. 4,783,038 and 4,190,227 related to isolators.

For other related prior art see U.S. Pat. Nos. 2,421,822, 3,204,911, and 4,397,069.

The inventor first considered the use of helical rope isolators as a pipe restraint in 1984. It was thought that the device would be a good seismic restraint which could replace snubbers on piping systems. Conversations with AEROFLEX, the major supplier of isolators, indicated that they did not think it would work well as an isolator due to the relatively low frequency content of the typical building response to an earthquake. The inventor's thoughts, at that time, were not to isolate the pipe from structure in order to minimize the seismic inputs to the pipe, but to use the device to add damping to the piping system and to maintain pipe displacement to acceptable levels during a seismic event. He recognized that while snubbers limited displacements, they added little damping to the system.

In 1984, accordingly, he built a test set-up to determine the response of a pipe supported with and without the isolators. Test results were very favorable, based on the amount of additional damping the isolator provided the system. He presented the results of the experiment in 1986 at the "Symposium on Current Issues Related to Nuclear Power Plant Structures, Equipment and Piping" at North Carolina State University. Those same results were later published in *Nuclear Engineering and Design* in 1988. This paper is identified as "Vol. 107, North-Holland, Amsterdam, 1988, pp 201-204".

Based on the encouraging test results, the inventor began to promote the idea of using isolators as a pipe restraint for seismic and hydraulic transient applications. This was done primarily at Commonwealth Edison Company and through public seminars he gave on piping design.

A commercial piping application occurred in 1990 when Commonwealth Edison elected to try isolators on a piping system which was causing a floor slab, to which the pipe was connected, to vibrate at unacceptable levels. The inventor incorporated helical isolators into a design which differs from the invention and allowed the existing pipe support hardware to be utilized. Pipe thermal expansion was not an issue in that case since the pipe was previously supported by rigid supports at the problem locations. It is also noted that in that particular application, the primary purpose of the device was to act as an isolator. The isolator application decoupled the pipe from the floor slab so as to minimize the pipe vibration input to the floor slab. This was a classical application of isolators. The secondary purpose of the device was to minimize the amplitude of the pipe vibration. This installation was a success.

The use of isolators as a pipe restraint has been promoted by the inventor for a number of years, however, the invention includes a new discovery which has not been previously known.

A principal problem in using isolators is that the conflict of design requirements between pipe thermal expansion and a system for restraint of dynamic events is not solved. While the use of an isolator can provide for some thermal expansion, it is generally limited to small amounts due to the restraining spring force the isolator imparts to the pipe. This provides for limited use of isolators as pipe restraints since direct use of conventional isolators as a pipe restraint results in the same conflict of design requirements between thermal expansion and restraining dynamic displacements. An isolator is a spring. For thermal expansion considerations, a soft spring is desirable so as to not over-stress the pipe or overload the terminating equipment. For dynamic events, however, a stiff spring is desirable since it is desired to limit the magnitude of the dynamic displacements.

An invention which is an energy absorption and pipe displacement limiting device of simple construction, ease of inspection and minimal maintenance was filed with the U.S. Patent Office on Dec. 16, 1991 as U.S.

application Ser. No. 07/808,132. The filed invention acts as a pipe restraint for connection between a pipe subject to movement due both to dynamic loads and to thermal deformations and an adjacent structure. It is adjustable in turnbuckle-like fashion and possesses symmetric stiffness in both tension and compression which resists buckling under load.

SUMMARY OF THE INVENTION:

The current invention offers a number of improvements of the invention filed as U.S. application Ser. No. 07/808,132. The improvements provide for a more efficient use of wire rope, a lighter and more compact restraint design, an additional means of providing for bi-linear spring stiffness properties, a means for limiting the load transferred to the structure and various means which provide for ease of manufacture.

Figure 2:
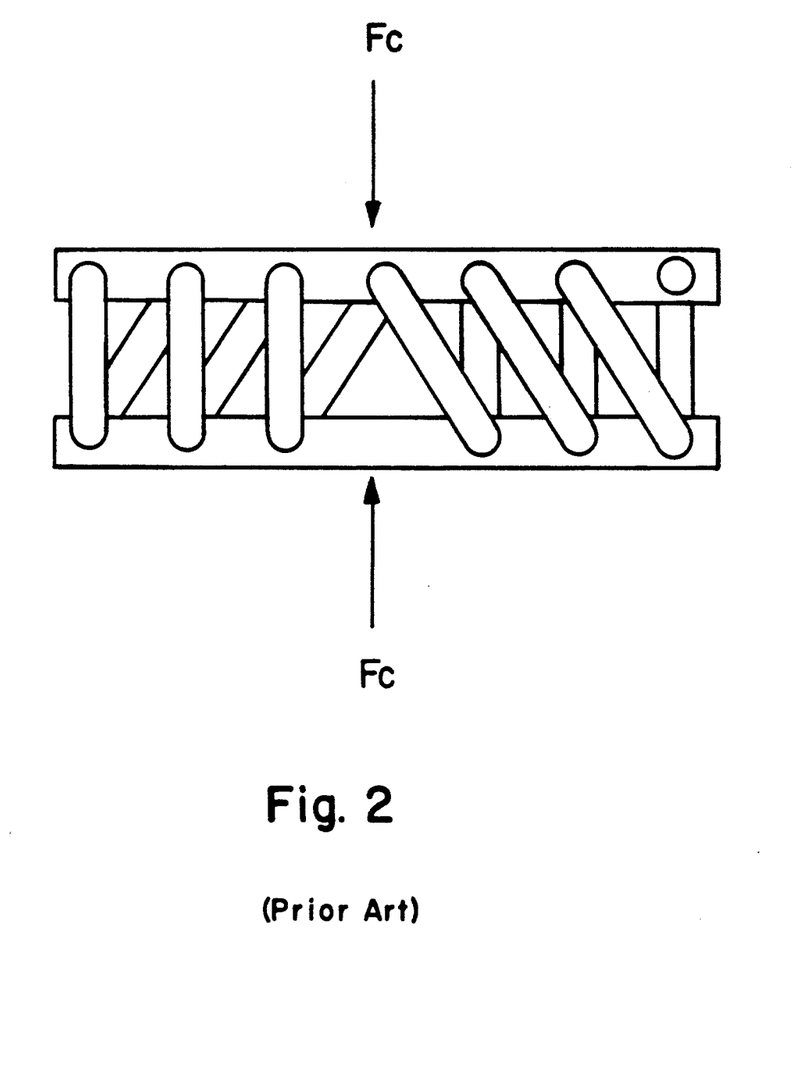
FIG. 2 is a schematic elevation view of a commercially available isolator subjected to compressive loading.
Figure 3:
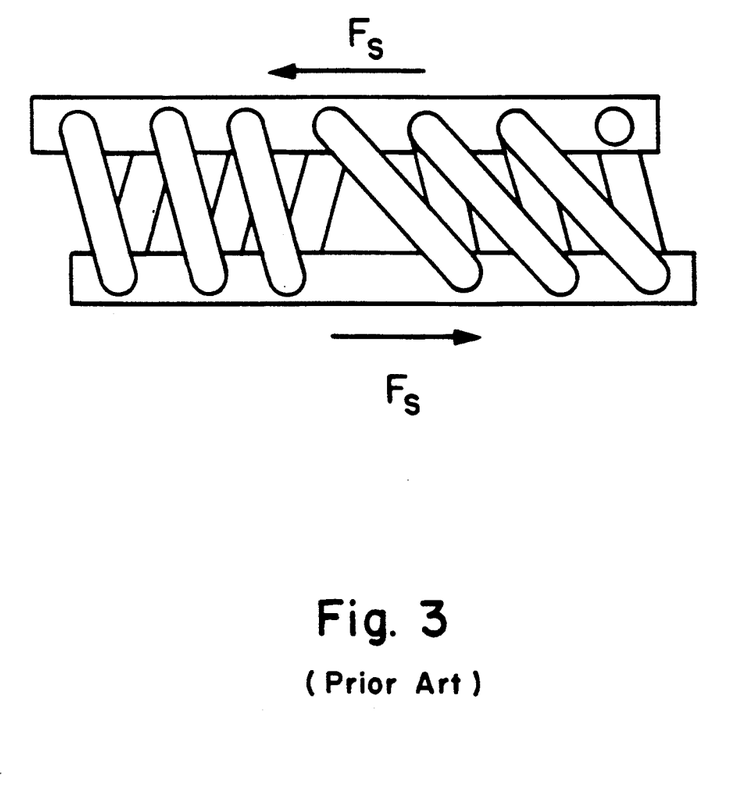
FIG. 3 is a schematic elevation view of a commercially available isolator subjected to shear loading.
Figure 4:
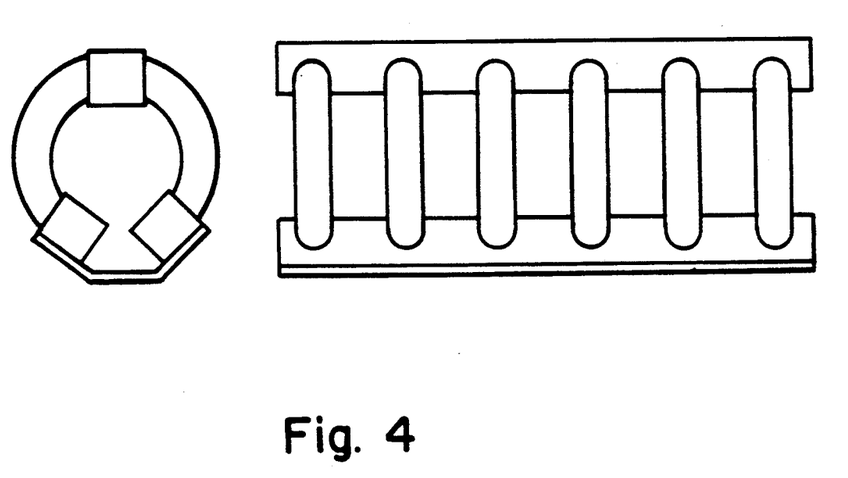
FIG. 4 is a schematic elevation view of an isolator with parallel bights formed from individual lengths of wire rope.
Figure 5:
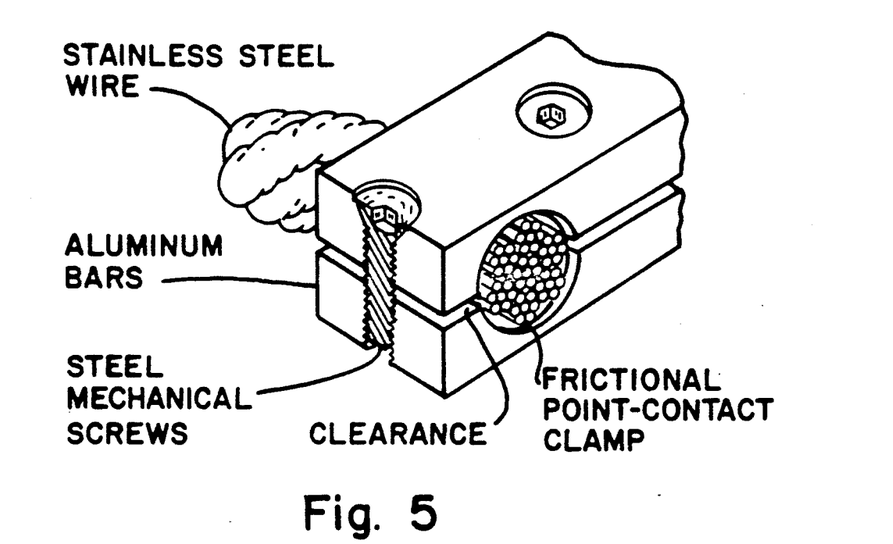
FIG. 5 is a schematic isometric view depicting a clamping method of trapping wire rope bights.
Figure 5A:
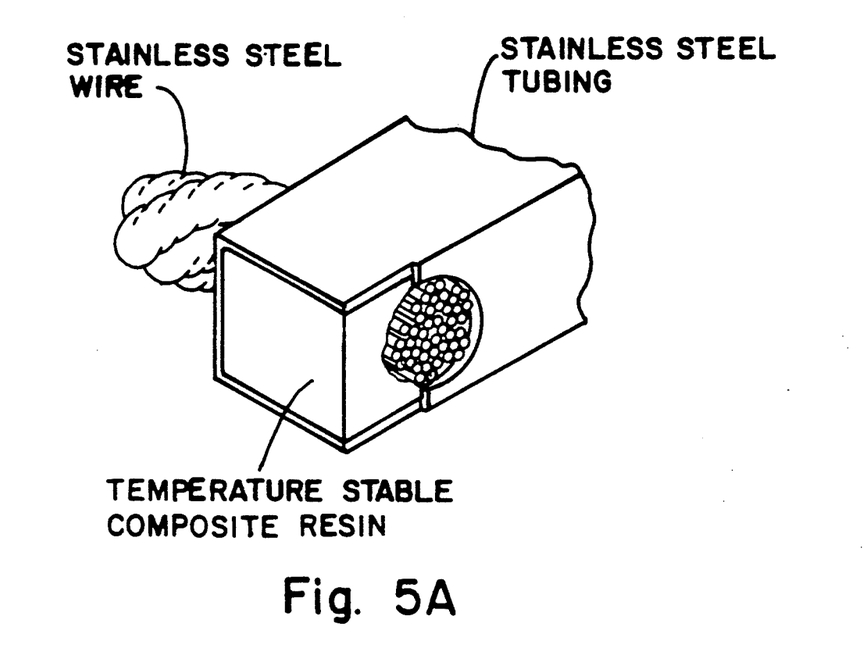
FIG. 5A is a schematic isometric view depicting an epoxy method of trapping wire rope bights.

The improvements to the previously filed invention are accomplished through alteration of the wire rope bight geometry and structural housing, and the addition of internal stops. The improvements each of these provide are discussed in the following paragraphs:

Wire Rope Bights - The bights of commercially available wire rope isolators used in the original invention are arranged such that they form a stable geometry when loaded in compression as shown in FIG. 2. This is accomplished by arranging the bights in opposing directions as indicated in FIG. 2. This stable arrangement of bights, however, is not required for the invention to work since the bights are loaded in shear rather than compression and are stabilized by the structural housing of the invention. Furthermore, the arrangement of bights in the fashion depicted in FIG. 2 provide for inefficient use of the wire rope in the invention. This is due to the difference in load which the bights carry when the isolator is loaded in shear as shown in FIG. 3. Some of the bights are more deformed and thus loaded heavier than the others. This inefficiency can be eliminated through the addition of a third retaining bar, forming each bight from individual lengths of rope and arranging all of the bights in parallel planes as depicted in FIG. 4. This method of employing individual lengths of rope and three retaining bars is similar to the arch isolator described in U.S. Pat. No. 4,783,038. An alternative method of trapping the bights is the use of a rectangular tube filled with epoxy as depicted in FIG. 5. This method of trapping the bights is incorporated in the design of isolators manufactured by ENIDINE of Orchard Park, N.Y.

The arrangement of parallel bights also provides for a bi-linear force-deflection properties without precompressing the bights. With a parallel bight geometry, the isolator is more flexible in shear when initially deflected and becomes increasingly stiffer as the deflection increases. Such bi-linear properties provide for a "soft" spring to allow for pipe thermal expansion and "stiff" spring properties to limit pipe dynamic displacements. The range of the "soft" portion of the spring can be further increased by precompressing the bights as previously disclosed in the U.S. patent application Ser. No. 07/808,132.

Figure 6:
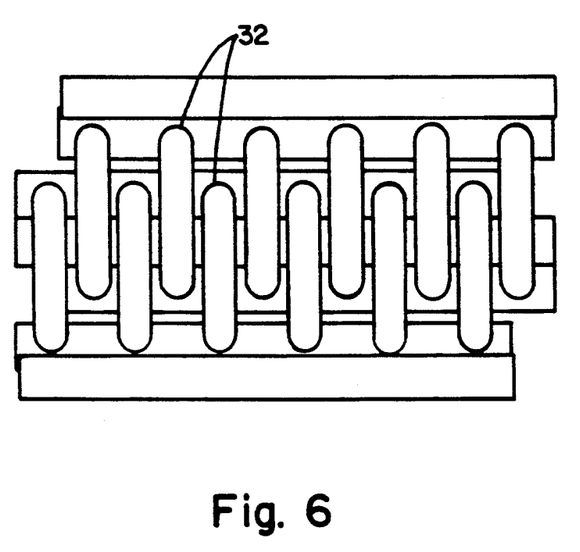
FIG. 6 is a schematic elevation view depicting two isolators combined.
Figure 6A:
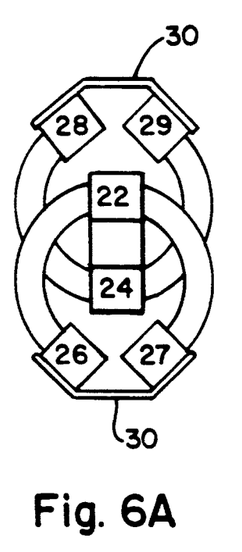
FIG. 6A is an end view of FIG. 6.

The efficient arrangement of the bights can also provide a means of reducing the profile of the pipe restraint structural housing. This is desirable since space is sometimes limited in nuclear and process plants, which would utilize these restraints. Alternate restraining devices provide for a compact overall geometry. A means of reducing the profile of the pipe restraints is accomplished by arranging the bights in a fashion depicted in FIG. 6.

Structural Housing - U.S. patent application Ser. No. 07/808,132 utilized a rectangular shaped structural housing for retaining the bights. The arrangement of bights in the fashion depicted in FIG. 6 more readily allows the use of a circular tube for the structural housing. This is desirable since tubing of various diameters and thicknesses are readily commercially available. The use of round tubing offers an alternate means of precompressing the bights, a means of protecting them from damage and a means of reducing the chance of human injury when the bights are deflected during pipe movements.

Figure 7:
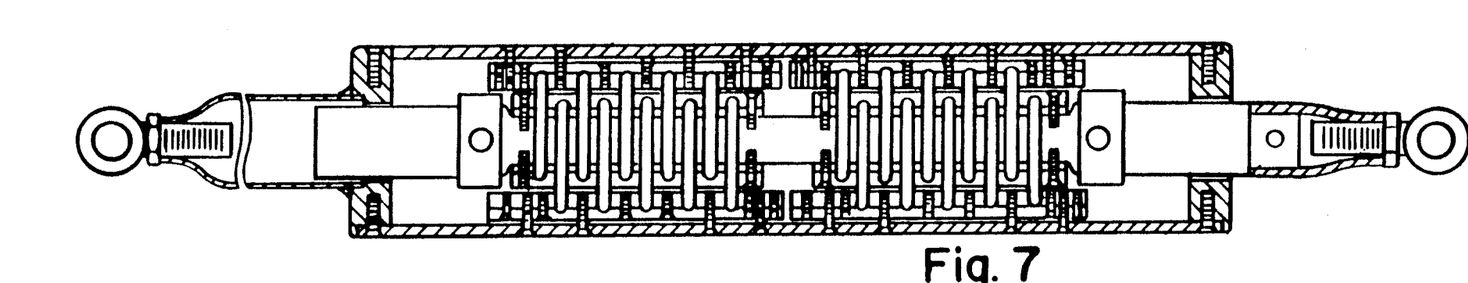
FIG. 7 is a schematic elevation view showing multiple isolators assembled into the invention.
Figure 7A:
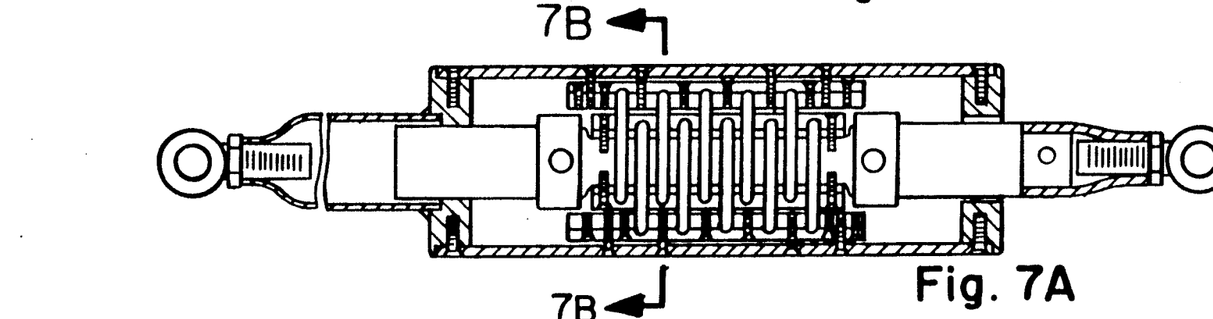
FIG. 7A is a veiw similar to FIG. 7 showing a single isolation assembly.
Figure 7B:
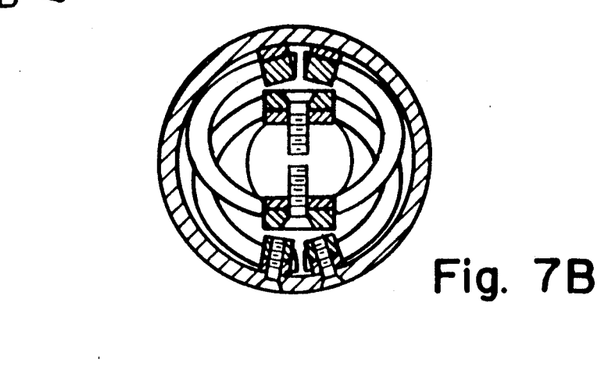
FIG. 7B is a view taken along line 7B—7B of FIG. 7A.
Figures 8, 8A, 8B:
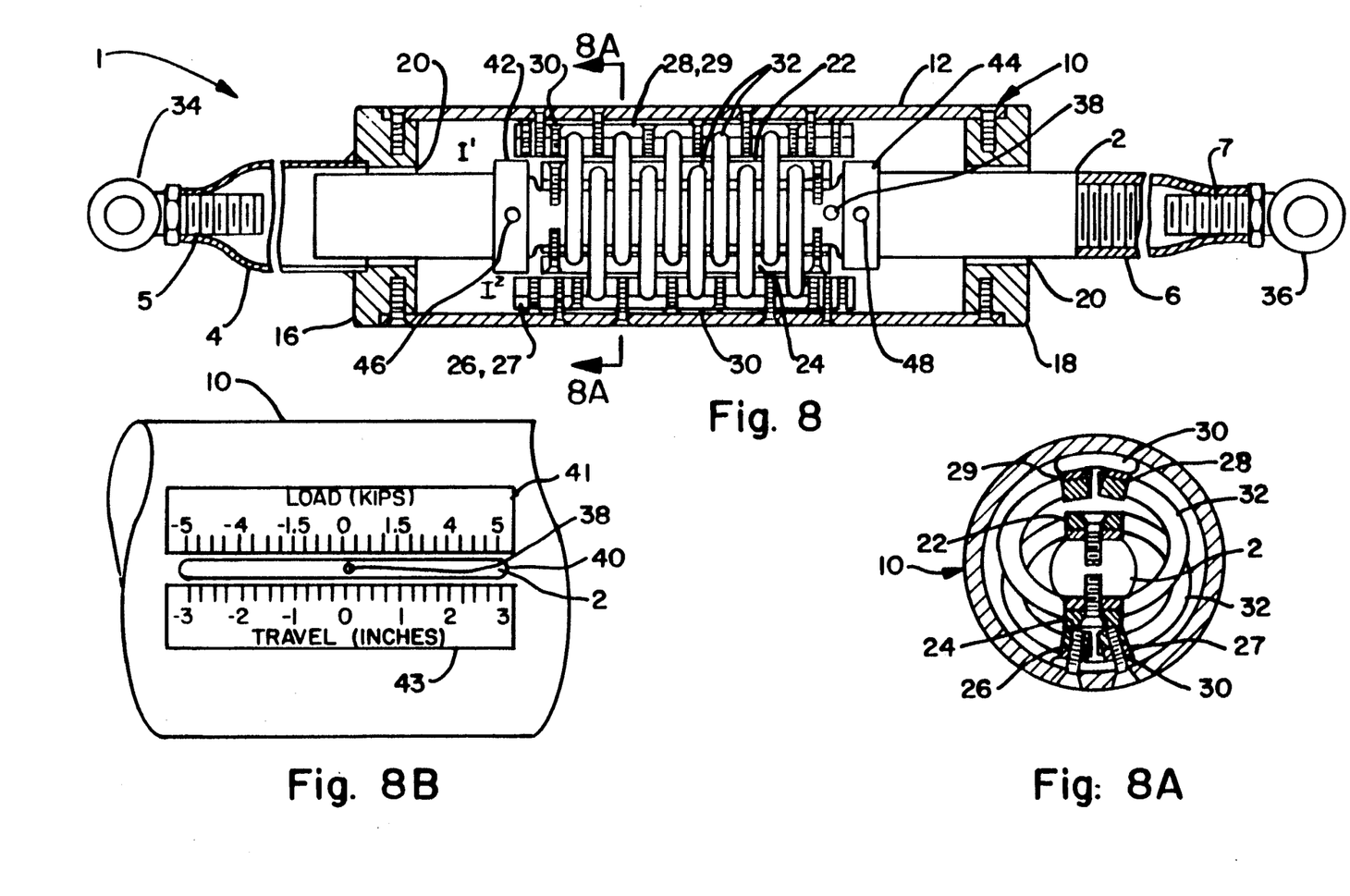
FIG. 8 is a schematic elevational view of the energy absorption and pipe displacement limiting device of the invention with its wire energy absorbing rope bights each having portions in a state of precompression due to base spacer bars.
FIG. 8A is a view taken along line 8A—8A of FIG. 8.
FIG. 8B is a fragmentary enlarged view of a scaled viewing slot to determine the central rod position.

A structural housing composed of circular tubing also provides for a means for efficient manufacturing to accommodate varying stiffness and load capacities. By manufacturing bights in standard size groups, the stiffness and load capacity of a restraint may be increased by simply adding more bight groups to a longer rod and structural housing as depicted in FIG. 7.

Internal Stops - The forces associated with piping hydraulic transients and seismic events are seldom accurately known. Industry designs for such forces using a "nominal" design load. While a nominal design load is chosen which is through to envelope the maximum actual load, occasionally the actual load exceeds the nominal design load. Pipe restraints are selected based on their capacity to carry a nominal design load. Exceeding this load on the restraint described in U.S. patent application Ser. No. 07/808,132 may result in plastic deformation of the wire rope bights due to excessive deflections. Such excessive deflection may also cause an overstress in the piping system. As a means of limiting such excessive deflections and still provide a safety margin in the force carrying capacity of the restraint, the displacement will be limited to the gaps provided. The stops may be welded or an integral part of the central rod. Alternatively, the stops may be fastened to the central rod by means of shear pins. Such shear pins are sized such that they are the weak link of the various load carrying members of the restraint. Their size are also dictated by the safety factor desired in the restraint rated load. The use of shear pins offer the additional ability of absorbing a large amount of energy should they be deformed plastically. This provides additional protection to the piping system under extreme dynamic events and limits to load transmitted to the structure to the shear pin-failure load.

The invention, thus, is an improved energy absorption and pipe displacement limiting device of simple construction, ease of inspection and minimal maintenance. It acts as a pipe restraint for connection between a pipe subject to movement due both to dynamic loads and to thermal deformations and an adjacent structure. It is adjustable in turnbuckle-like fashion and possesses symmetric stiffness in both tension and compression which resists buckling under load.

The invention arranges wire rope bights in a compact manner such as to minimize the profile of the restraint. The arrangement of the bights also provides for an efficient means of loading all bights equally. Internal stops provide a means of protecting the bights from excessive displacements. Shear pins provide a means absorbing additional one time energy and act as the weak link of the restraints load carrying elements.

The novel device of the invention includes a central rod having a hollow cylinder mounted at each end thereof. A first hollow cylinder slidingly telescopically receives one end of the central rod and a second hollow cylinder threadedly or otherwise fixedly receives the other end of the central rod. This latter end, if threaded or field welded, can provide a permanent length adjustment of the restraint. Connected to the first cylinder, and having walls spaced from and surrounding an intermediate portion of the central rod for axial movement relative thereto, is an end cap. The end cap is screwed or otherwise connected to a circular tube which acts as a frame or structural housing. Connected to the other end of the tube is another end cap which surrounds an intermediate portion of the central rod and allows for the relative axial movement. First base members are located and mounted at opposing locations on the periphery of the intermediate portion of the central rod. Second and third base members are located and mounted at tube (frame or housing) wall locations opposite the first base forming members. A symmetrical arrangement of wire energy absorbing rope bights, each having portions in a state of precompression, is fixed to the first base member and the second and third base members to provide a pipe movement restraint having bi-linear spring properties.

The base members include both bight capturing members and spacer bars to determine the extent of precompression of the wire energy absorbing rope bights and therefore to adjust the stiffness ranges of the bi-linear spring properties.

The base forming members of the bights may be composed of parallel plates which trap the wire rope by friction or hollow tube members filled with epoxy as the means of securing the wire rope.

Connected by shear pins to the central rod are two disks which act as internal limit stops and limit the deflections of the bights. The shear pins act as the controlled weak link of the restraint's load carrying parts and provide for an additional means of absorbing energy should the rated load of restrain be exceeded.

The device is attached between the pipe and adjacent structure with capability for an "in-field" turnbuckle type of restraint adjustment. This is made possible by the ends of the first and second hollow cylinders remote from the intermediate portion of the central rod having threads of opposite hands to which connecting rods with eyes are adjustably attached by means of the threads.

The invention geometrically arranges isolators in such a fashion so as to allow one end of the invention to be connected to a pipe and the other end connected to a static structure. The restraint allows for thermal expansion, exhibits excellent damping characteristics and has a high cycle fatigue life. The invention can carry tension and compression loads without buckling and is adjustable in turnbuckle-like fashion.

The invention utilizes wire rope bights in a "turnbuckle" tube with spacer bars to create a condition of precompression. This solves the conflict of design requirements by providing an adjustable pipe restraint with bi-linear spring properties. That is, the invention has a "soft" spring range for thermal expansion and a "stiff" spring range for dynamic events. The isolator coils are precompressed such that a bi-linear force deflection curve is produced by arranging the bights in parallel planes, varying the structural housing tube diameter and by the addition of spacer bars. By altering tube diameter and/or the thickness of the spacer bars, the range of the "soft" portion of the spring, provides for varying degrees of pipe thermal deformation and, or, displacement.

The response characteristics of the restraint can be designed by varying the diameter of the wire rope, the number of strands in the rope, the rope length, the twist or lay of the wire rope, the geometry of the arrangement and the number of bights, by precompressing the bights the ranges of spring stiffness can be further altered. The invention provides for the arrangement of isolators in such a way that a bi-linear spring is produced. This is a desirable attribute which provides for both thermal deformation of the pipe and dynamic load protection.

DETAILED DESCRIPTION OF THE PREFERRED EMBODIMENT

The numeral 1 generally designates the improved energy absorption and pipe displacement limiting device or pipe restraint of simple construction, ease of inspection and minimal maintenance constructed according to the principals of the invention. The device is for connection between a pipe subject to movement due to dynamic loads and thermal change loads or deformation and an adjacent structure.

The device 1 is an assembly which includes a central rod 2 having a hollow cylinder 4 mounted at one end thereof with internal threads of one hand and a hollow cylinder 6 mounted at the opposite end thereof with internal threads of the opposite hand, with the threads of each respective cylinder being at the cylinder end remote from the intermediate portion of rod 2.

The rod 2, at one end, is received in hollow cylinder 4 internally in a slidingly telescopically relationship. At its opposite end, rod 2 is threadedly received in cylinder 6.

Connected to the cylinder 4 is a tube or housing 10 having a side wall 12 spaced from and surrounding the intermediate portion of the central rod 2. The tube or housing 10 also has end walls 16 and 18, each with a bushing or opening 20 to allow the frame 10 to slide without binding axially, on and relative, to rod 2.

A pair of opposed isolators with parallel bights 32 generally designated $I^1$ and $I^2$ are mounted in the tube 10 and include, respectively, first base forming members 22 and 24 at opposing locations on the periphery of the intermediate portion of rod 2 and respectively, second and third base forming members 26, 27, 28 and 29 at locations on walls 12 and 14 opposite base forming members 22 and 24. The base forming members 22, and its opposites 26 and 27, and 24, and its opposites 28 and 29, are positioned in spaced relation to each other in accordance with and at a distance dependant on, other base forming members or spacers 30 which have thicknesses to determine how much precompression wire energy absorbing rope bights 32 are subjected to. The magnitude of this precompression determines the spring characteristics as shown in FIG. 3.

A pair of disks 42 and 44 are connected to the central rod 2 by means of shear pins 46 and 48. The gaps between disk 46 and end cap 16 and disk 48 and end cap 18 are dictated by the maximum travel which isolators $I^1$ and $I^2$ are permitted to travel. The shear pins 46 and 48 are sized such that they are the weak link of the load carrying members and provide the safety factor to failure for the device. The shear pins 46 and 48 also provide an additional means of absorbing energy should failure load be imposed on the restraint and limit the load on the building structure.

Threaded into the first and second mentioned hollow cylinders 4 and 6 and having mating opposite handed threads for engagement with the same at the ends of the cylinders remote from the intermediate portion of central rod 2, are connecting rods 34 and 36, respectively. One of the connecting rods will connect to a pipe harness (not shown), for example, and one to an adjacent structure (not shown) which may be a static structure such as a part of a building or an adjacent piece of process equipment. Holes (not shown) may be provided in cylinders 4 and 6 for determination of minimum thread engagement of the connecting rods 34 and 36, with cylinders 4 and 6, respectively.

The tube housing 10 is provided a scaled viewing slot 40 which receives a pin 38 which is mounted in the central rod 2 so as to determine the position of the central rod 2.

Nameplates 41 and 43 are marked to allow one to determine the level of deflection of the isolators $I^1$ and $I^2$ and the restraint load.

Figure 9:
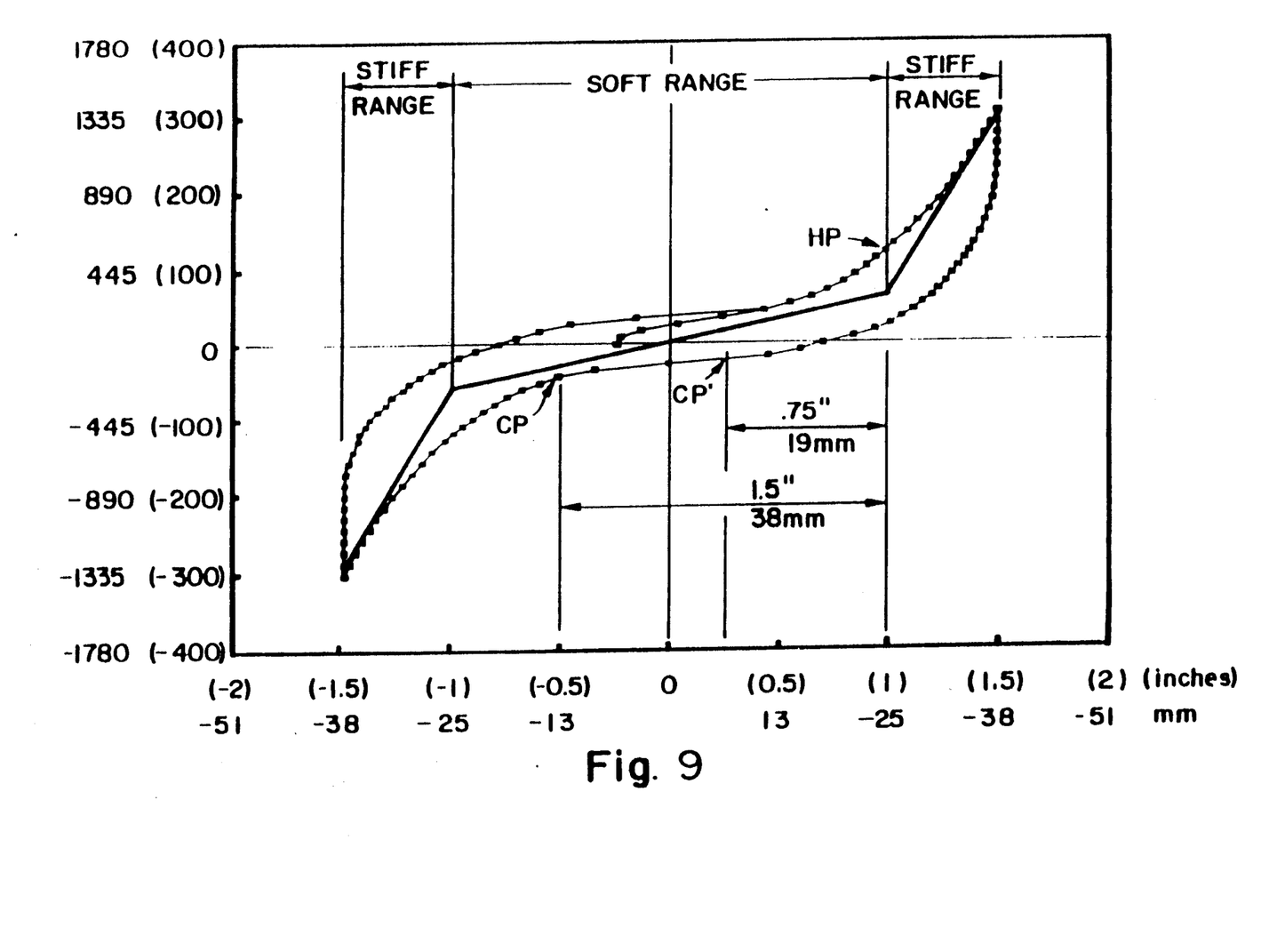
FIG. 9 is a graph illustration of the bi-linear spring characteristics of a typical device as shown in FIGS. 8 and 8A under, for example, 38 mm (1.5 inches) of precompression.

Referring to force-deflection curve shown in FIG. 9, the "soft" and "stiff" spring ranges are identified for one particular example of the invention. Based on the pipe having a 38 mm (1.5 inch) thermal travel along the axis of the restraint, one would set the length of the restraint such that the isolators were deflected to point CP when the pipe was cold. As the pipe expands, the isolators are deflected to the point HP. As the pipe grows, the restoring force which the restraint imposes on the pipe goes from approximately $-156$ N ($-35$ lbs.) to 512 N (115 lbs.) The average "soft" spring constant is approximately 1.75 N/M (100 lb/in.) Once in the hot position, the average spring constant is approximately 3.5 N/M (200 lb/in.) or twice the soft spring constant. This higher spring constant provides for more limited displacements when the pipe is subjected to dynamic loadings. This ratio of spring constants can be varied by the choice of isolators I, diameter of the tube 10, and/or the thickness of spacer plates 30. Because the force deflection curve is symmetric under tensile or compressive loadings, the restraint may be installed such that it elongates as the pipe expands or shortens as the pipe expands. Furthermore, a restraint can provide for smaller thermal movements than the "soft" range provided by the particular restraint. For the example given, if the thermal movement was say 19 mm (0.75 inches), the restraint would simply be set at point CP' shown on FIG. 3. As the pipe expands, the restraint position would go to point HP.

Accordingly, it will be seen that by means of the described structural arrangement, the invention provides a means for controlling piping displacements due to dynamic loadings including seismic events, fluid induced vibration and equipment induced vibration. The invention geometrically arranges isolators so as to produce a restraint with bi-linear spring properties. The invention provides a "soft" spring range so as to allow for pipe thermal expansion. A "stiff" spring range is provided so as to control pipe dynamic movements. The range of the soft spring is controlled by the choice of the isolators and the amount which the isolators are precompressed. The range and stiffness of the "stiff" ranges are controlled by the choice of the isolator. The invention can carry tensile and compressive forces. The invention stabilizes the isolators so as to prevent gross structural buckling of the restraint under compressive loading. The invention limits the maximum deflection to which the isolators may be subjected by the location of the internal stops 42, 44. The invention utilizes shear pins 46, 48 to provide a weak link and thus a means of controlling the failure mode of the restraint, absorbing additional energy and limiting the load on the adjacent structure. The invention is simple, requiring no maintenance and has a high fatigue life.

I claim:

1. An improved energy absorption and pipe displacement limiting device of simple construction, ease of inspection and minimal maintenance, said device for connection between a pipe subject to movement due to dynamic loads and thermal deformation and an adjacent structure and possessing symmetric stiffness in both tension and compression which resists buckling under load being characterized by:

an assembly which includes a central rod having a hollow cylinder mounted at each end thereof, a first hollow cylinder slidingly telescopically receiving one end of said central rod and a second hollow cylinder fixedly receiving the other end of said central rod;

a tube frame connected to said first cylinder and having walls spaced from and surrounding an intermediate portion of the central rod for axial movement relative thereto;

first base members mounted at opposing locations of the intermediate portion of the central rod;

second and third base members mounted at wall locations opposite said first base forming members;

a symmetrical arrangement of wire energy absorbing rope parallel bights, each having portions in a state of precompression fixed to said first base member and to said second base member to provide a pipe movement restraint having bi-linear spring properties;

2. The device of claim 1 in which a pair of disks is fastened to the central rod by shear pins to limit relative axial movement of said first and second hollow cylinders.

3. The device of claim 1 in which the base members include spacers to determine the extent of precompression of the wire energy absorbing rope bights.

4. The device of claim 1 in which adjacent bights are individual lengths of wire energy absorbing rope each forming substantially parallel planes to one another which provide for bi-linear stiffness spring properties.

5. The device of claim 1 in which the ends of said first and second hollow cylinders remote from said intermediate portion of the central rod have threads, one of which is a right hand thread and one of which is a left hand thread, for adjustment of the relative travel of the tube frame and therefore the limit of pipe travel by means of a connecting rod adjustably mounted at each cylinder's remote ends in said cylinder threads for a turnbuckle type of adjustment.

6. The device of claim 1 in which disks provide a means of limiting the deformation of the wire energy absorbing rope bights.

7. The device of claim 6 in which shear pins between the central rod and the disks act as weak links to control the failure mode of the device, absorb additional amounts of energy under failure, and limit the load on the adjacent structure.

* * * * *